US012569889B1

(12) United States Patent
van Zon et al.

(10) Patent No.: US 12,569,889 B1
(45) Date of Patent: Mar. 10, 2026

(54) GAS HEATING SYSTEM FOR A PARTS WASHING MACHINE, AND TO THE METHOD OF CONVERTING AN ELECTRIC PARTS WASHING MACHINE TO A GAS PARTS WASHING MACHINE

(71) Applicant: Alliance Manufacturing, Inc., Fond du Lac, WI (US)

(72) Inventors: David Nicholas van Zon, Rosendale, WI (US); Benjamin Noah Dickenson, Fond du Lac, WI (US)

(73) Assignee: Alliance Manufacturing, Inc., Fond du Lac, WI (US)

( * ) Notice: Subject to any disclaimer, the term of this patent is extended or adjusted under 35 U.S.C. 154(b) by 312 days.

(21) Appl. No.: 18/244,129

(22) Filed: Sep. 8, 2023

Related U.S. Application Data

(60) Provisional application No. 63/405,351, filed on Sep. 9, 2022.

(51) Int. Cl.
*B08B 3/10* (2006.01)
*B08B 13/00* (2006.01)
*F24H 1/12* (2022.01)

(52) U.S. Cl.
CPC ................ *B08B 3/10* (2013.01); *B08B 13/00* (2013.01); *F24H 1/124* (2013.01); *B08B 2203/007* (2013.01)

(58) Field of Classification Search
CPC ..... B08B 3/10; B08B 13/00; B08B 2203/007; F24H 1/124
See application file for complete search history.

(56) References Cited

U.S. PATENT DOCUMENTS 1,343,644 A 6/1920 Richardson
2,675,012 A * 4/1954 Scales ..................... B08B 3/006 134/91
2,833,273 A 5/1958 Miller
2,897,830 A * 8/1959 Palmer .................... B08B 3/006 134/99.1
3,575,157 A 4/1971 Whittel, Jr.
3,890,988 A * 6/1975 Lee ......................... B08B 3/006 134/40
(Continued)

FOREIGN PATENT DOCUMENTS

GB 2478745 A * 9/2011 ............... B08B 3/10
GB 2569115 A * 6/2019 ........... C11D 3/3738
(Continued)

*Primary Examiner* — Benjamin L Osterhout
(74) *Attorney, Agent, or Firm* — Brannen Law Office, LLC

(57) ABSTRACT

A gas heating system for a parts washing machine with at least one zone is provided. The parts washing machine can be a new system or a converted system (having electric elements replaced with heat exchangers). The heat system has one or more tankless heaters. Plumbing is provided having a main circulation loop, a main circulation loop pump, a zone loop and a zone loop pump. Two adapters can be used to allow the plumbing to enter the reservoir through a heater hole, wherein it is connected to the heat exchanger optionally with a manifold. Water in the main circulation loop is held at a predetermined temperature. The zone pump circulates water to and from the main circulation loop and heat exchangers if the temperature in the reservoir falls below a predetermined level.

20 Claims, 16 Drawing Sheets

(56) References Cited

U.S. PATENT DOCUMENTS

| | | | | | |
|---|---|---|---|---|---|
| 4,412,526 | A | | 11/1983 | DeGrose | |
| 5,368,053 | A | * | 11/1994 | Wilson | B08B 3/06 134/135 |
| 6,019,110 | A | * | 2/2000 | McClure | B08B 3/006 134/108 |
| 7,128,075 | B2 | * | 10/2006 | Publ | B08B 3/006 134/107 |
| 7,460,769 | B2 | | 12/2008 | Ryks | |
| 7,740,711 | B2 | * | 6/2010 | Porter | B08B 3/006 134/108 |
| 8,763,619 | B2 | * | 7/2014 | Lele | B08B 3/10 134/147 |
| 2002/0017314 | A1 | * | 2/2002 | McClure | B08B 3/006 134/10 |
| 2008/0216770 | A1 | | 9/2008 | Humphrey et al. | |
| 2018/0161827 | A1 | * | 6/2018 | Jasper | B08B 13/00 |
| 2020/0331036 | A1 | * | 10/2020 | McHaffie | B08B 3/045 |

FOREIGN PATENT DOCUMENTS

| | | | | | |
|---|---|---|---|---|---|
| JP | H0957223 | A | * | 3/1997 | |
| WO | WO-0024533 | A1 | * | 5/2000 | B08B 3/006 |
| WO | WO-2013054125 | A1 | * | 4/2013 | B08B 3/006 |

* cited by examiner

GAS HEATING SYSTEM FOR A PARTS WASHING MACHINE, AND TO THE METHOD OF CONVERTING AN ELECTRIC PARTS WASHING MACHINE TO A GAS PARTS WASHING MACHINE

This United States utility patent application claims priority on and the benefit of pending provisional application 63/405,351 filed Sep. 9, 2022, the entire contents of which are hereby incorporated herein by reference.

BACKGROUND OF THE INVENTION

1. Field of the Invention

The present invention relates to an improved gas heating system for a parts washing machine, and to the method of converting an electric parts washing machine to a gas parts washing machine, and in particular to a heating system for a parts washing machine with a reservoir utilizing a heat exchanger in the reservoir, and to a method of replacing the electric heating elements with a heat exchanger having water heated by gas external of the parts washing machine housing.

2. Description of the Related Art

Parts washing machines have one or more zones. In one configuration, the parts washing has a wash zone, a rinse zone and a drying, or blowoff, zone. In the wash and rinse zones, solution tanks are used to contain a fluid, such as wash water, rinse water, or for another purpose, and is preferably kept at a specific temperature (or range of temperatures). It is also desirable in some circumstances that the drying/blowoff zone reservoir be heated. The drying/blowoff zone fluid is typically air.

Both gas and electric heaters are used in the parts/component washing industry to heat the reservoirs containing fluids (solution tanks for liquids and/or air chambers for gasses).

Generally, a gas heated solution tank utilizes immersion heating with an immersed tube. This generally requires a large footprint, not just for the tank that houses the immersed tube, but also space outside of the tank for direct coupled burner and the gas distribution system. The immersion tubes require a minimum straight run of the tube length in order to operate properly and get the efficiencies desired from the tube. Waste heat can also pose a challenge, as there is a need to manage the heat produced in the immersion heater after it exhausts from the heater. Further, some users may find it undesirable to have an immersion tube, containing a flame, be located within the machine. Yet, even with these drawbacks, gas is often a preferred heat source since it affords a superior operational cost.

In smaller (and even some larger) parts washing machines, electricity can be effectively used to heat the solution tanks. Doing so requires heating elements be put into the reservoirs to directly heat the fluid contained therein. For these small washers, electric heat is often preferred since the tanks can be very compact, there is no exhaust gas to manage, and the unit costs are economical. Yet, the operational costs of an electric heat system can be much higher than the costs of a gas system on a per BTU comparison basis. The costs associated with the inefficiencies of electric heat increase as the required thermal load increases. Further, each zone requires a separate electric heater.

Because of the energy physical and environmental costs, it may be desirable to replace an electric system with a gas system. Yet, the capital costs may be prohibitive as an entirely new system has been required in the past.

Thus, there exists a need for an improved gas heating system, and for a method of converting an electric system that solves these and other problems.

SUMMARY OF THE INVENTION

A gas heating system for a parts washing machine with at least one zone, and to the method of converting an electric parts washing machine to a gas parts washing machine, is provided. The parts washing machine can be new system or a converted system (having electric elements replaced with heat exchangers). The heat system has one or more tankless heaters. Plumbing is provided having a main circulation loop, a main circulation loop pump, a zone loop and a zone loop pump. Two adapters can be used to allow the plumbing to enter the reservoir through a heater hole, wherein it is connected to the heat exchanger optionally with a manifold). Water in the main circulation loop is held at a predetermined temperature. The zone pump circulates water to and from the main circulation loop and heat exchangers if the temperature in the reservoir falls below a predetermined level.

There are many aspects and of the present invention, which each can have unique and independent advantages, as set out in particular in the appended claims.

According to one advantage of the present invention, the heat exchanger can replace an electric heating element in the reservoir of the parts washing machine. Multiple heat exchangers can be used to replace multiple heating elements in a reservoir to achieve the desired amount of heat transfer capacity. In this regard, the washing machine can be heated by gas, electric or even a combination of gas and electric heat.

An adapter can be used to connect the heating system to the reservoir through the same heater hole as the electric heater, and no other modifications to the machine is necessary. In this regard, the replacement can be universally used regardless of make, model, size or age of the machine with use of a proper adapter (can be flanges, screw-in, or otherwise). One preferred adapter is an adapter plate. It is preferred that two adapter plates are used, one for the zone loop feed line and one for the zone loop return line. The adapter plate connects to zone loop and covers the rest of the respective heater hole.

According to another advantage of the present invention, the heat exchanger can be sized and designed to provide the same amount of heat to the solution as the replaced electric heater(s).

According to a still further advantage of the present invention, the heat exchanger (or heat exchangers) can fit through the access port of the machine housing.

According to another advantage of the present invention, one or more instant on tankless gas heaters can (but do not necessarily need to) operate at a location remote from the machine. This advantageously allows for improved waste heat and exhaust management. It is contemplated that the heaters could even be located in a different room (in applications where it is desired to have a clean room or explosion proof parts washing machine). Further, the invention is modular, as the number of tankless heaters used can be determined based on the thermal load of the washing machine.

According to another advantage of the present invention, each zone could have a reservoir that is heated to a specific temperature or range of temperatures.

According to a further advantage of the present invention, the reservoir can be a tank in a wash or rinse zone, or a chamber in a blowoff zone.

According to another advantage of the present invention, a main circulation loop provides hot water to each of the zones through individual zone loops. This advantageously eliminates the need to have multiple independent heating sources to operate a multi-zone parts washing machine.

According to a further advantage of the present invention, each zone loop is independently operable.

According to a further advantage of the present invention, each zone can be heated to a preselected temperature, which can be different.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 19:
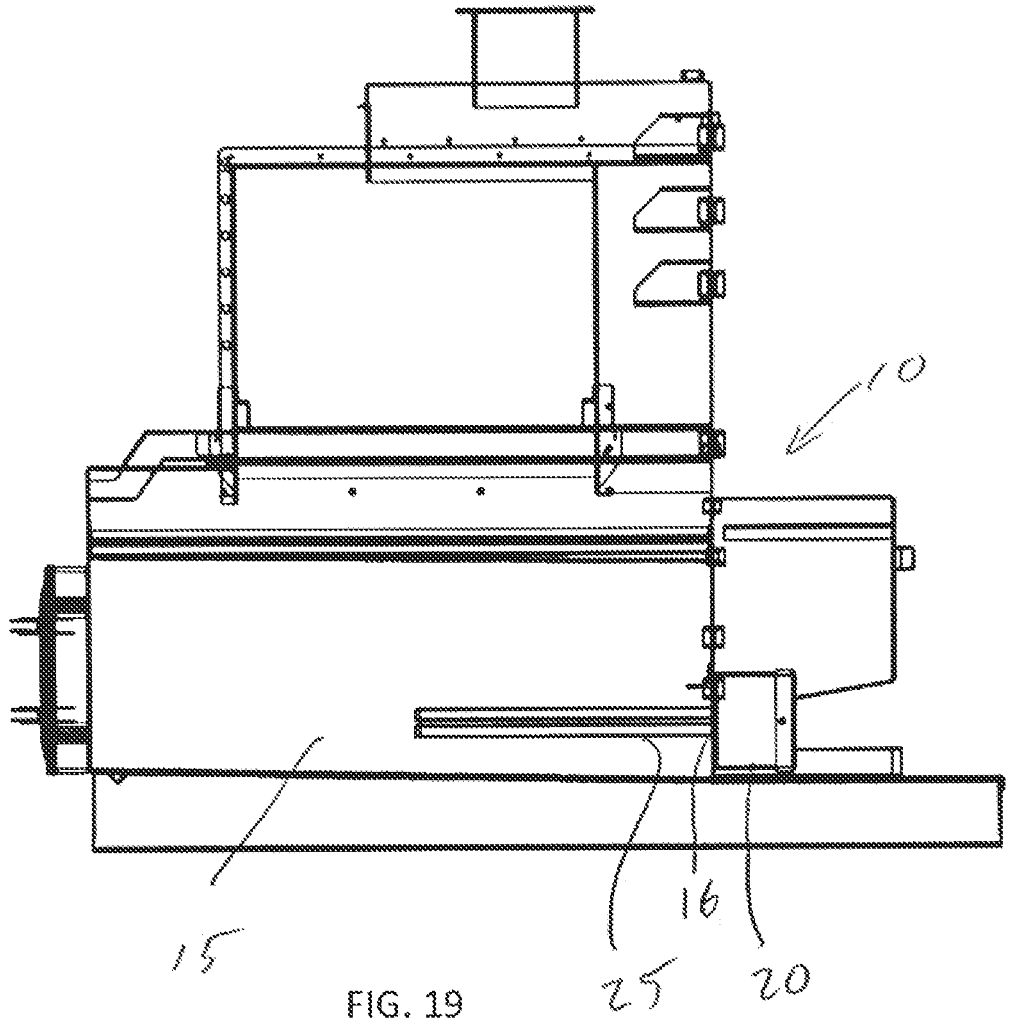
FIG. 19 is a side view showing an electric heater with heating elements in a reservoir.

Turning first to FIG. 19, it is seen that an electric parts washing machine 10 is shown having a reservoir 15. The reservoir has at least one heater hole 16. A heater 20 is provided. One or more heating elements 25 pass through respective heating holes 16 to directly heat a medium, such as liquid or air, that is contained in the reservoir. There can be multiple heater holes provided, which can allow multiple heaters to be utilized when desired. A cover can be used to cover any unused heater hole.

It is appreciated that the term "parts" does not limit the type, size, structure or purpose of the work piece that can be cleaned with the present invention. To the contrary, the terms "part" or "parts" can include any number or pieces, components, assemblies or other products.

It is also appreciated that the terms "fluid" and "medium" can refer to either a liquid (such as wash solution, rinse water, etc.) or a gas (such as air).

Now, turning to FIGS. 1-17, it is seen that a preferred embodiment of the present invention is illustrated.

Figure 1:
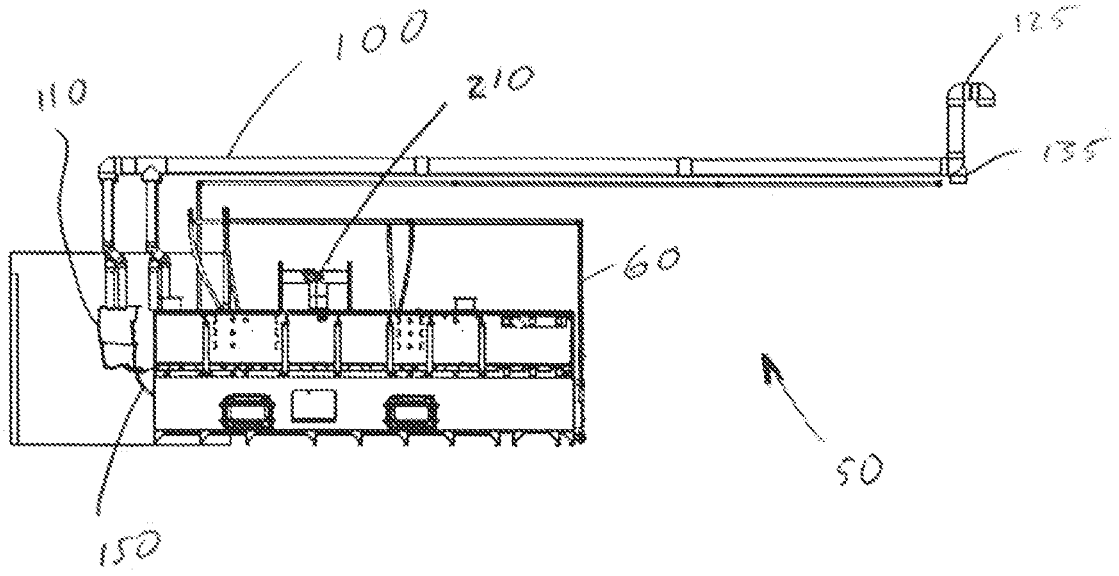
FIG. 1 is a front view showing an embodiment of a washing machine having three zones.
Figure 2:
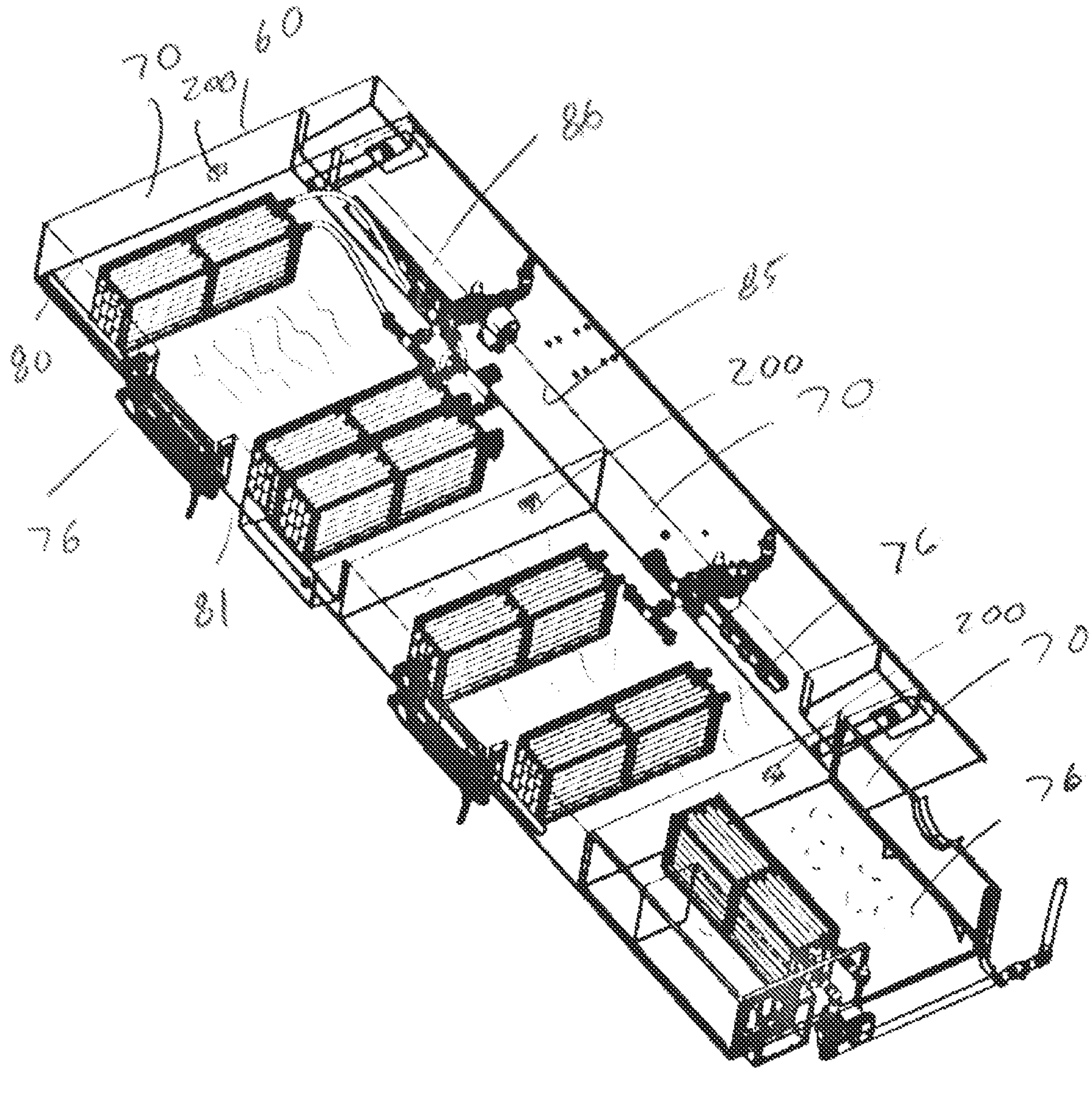
FIG. 2 is a perspective view showing a washing machine with three zones.
Figure 3:
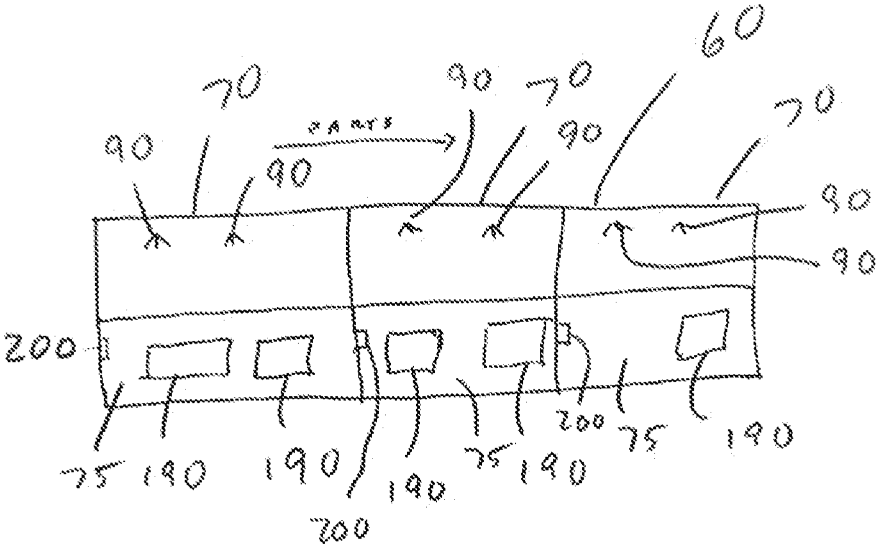
FIG. 3 is a schematic drawing showing a three-zone housing.
Figure 4:
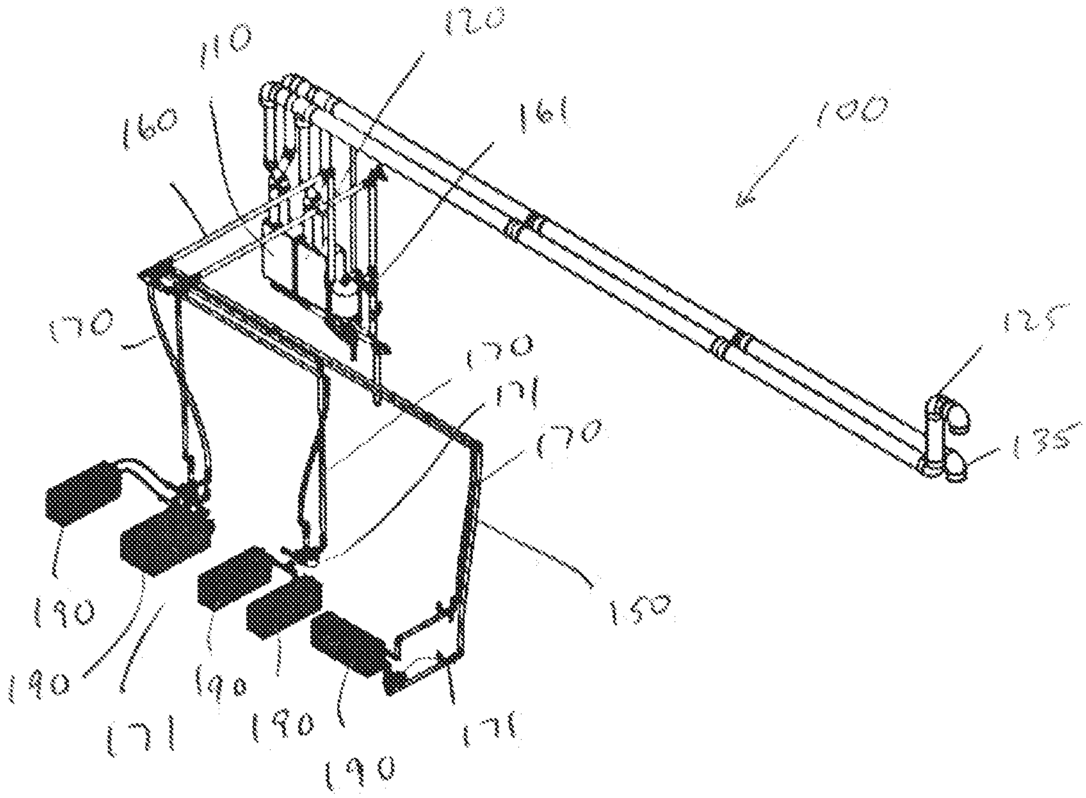
FIG. 4 is a perspective view showing an embodiment of a heat assembly.
Figure 5:
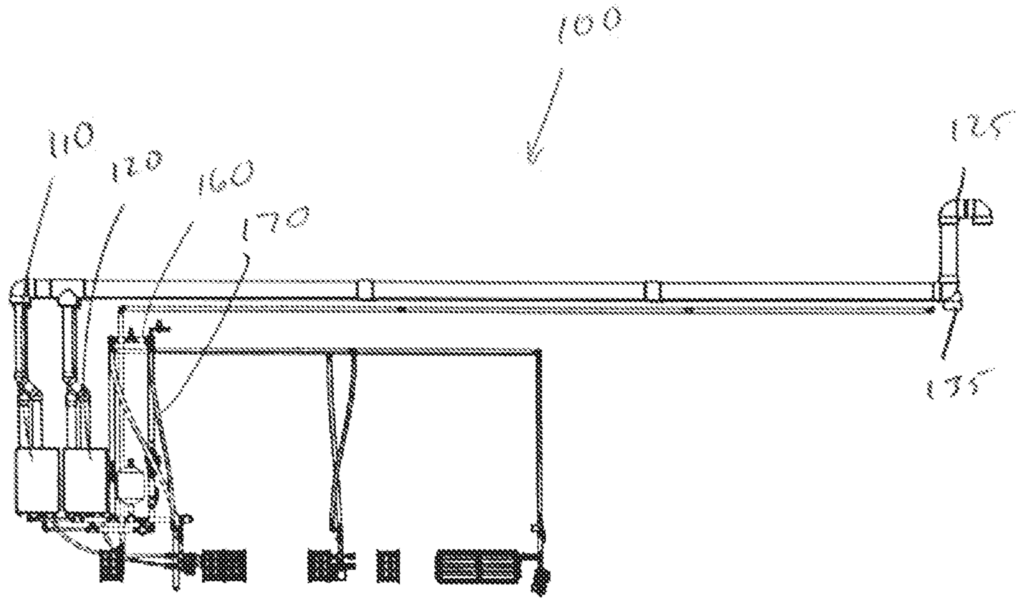
FIG. 5 is a front view of the heat assembly illustrated in FIG. 4.
Figure 6:
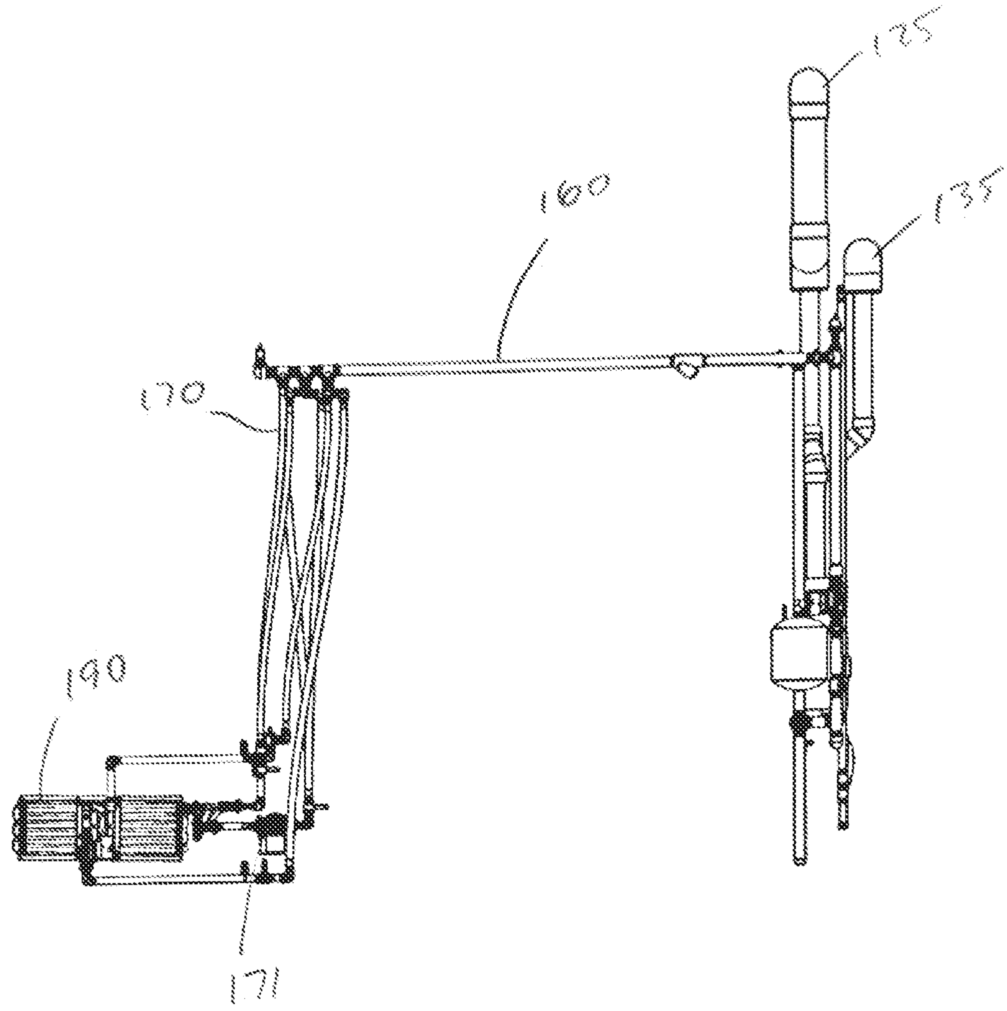
FIG. 6 is a side view of the heat assembly illustrated in FIG. 4.
Figure 7:
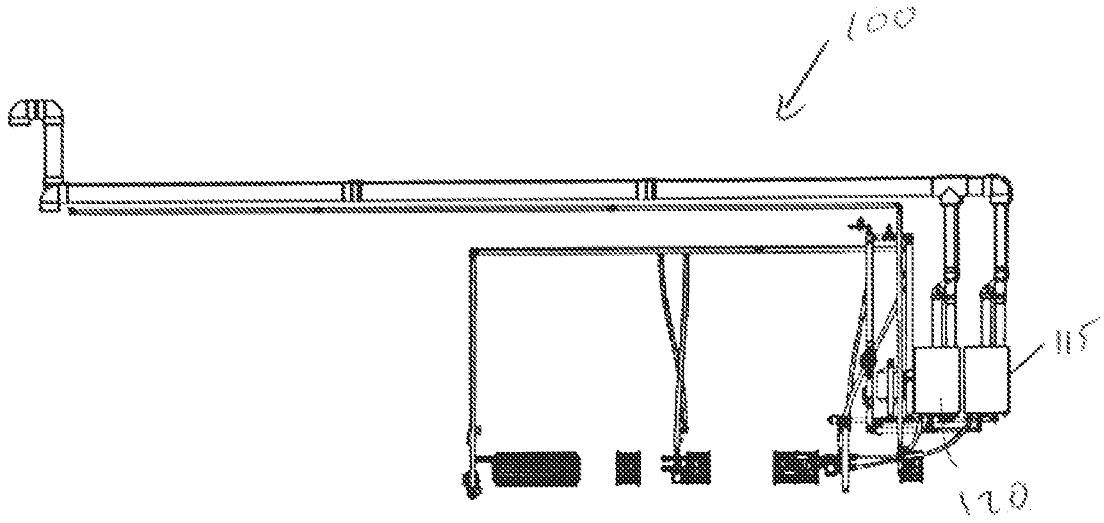
FIG. 7 is a rear view of the heat assembly illustrated in FIG. 4.
Figure 8:
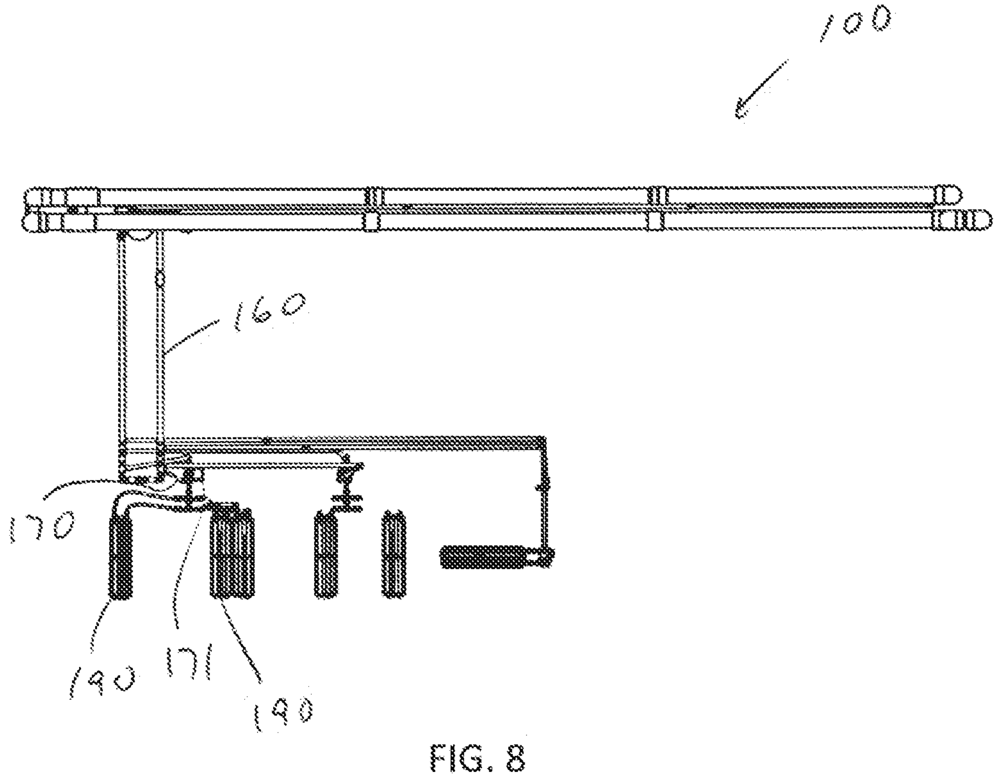
FIG. 8 is a top view of the heat assembly illustrated in FIG. 4.
Figure 9:
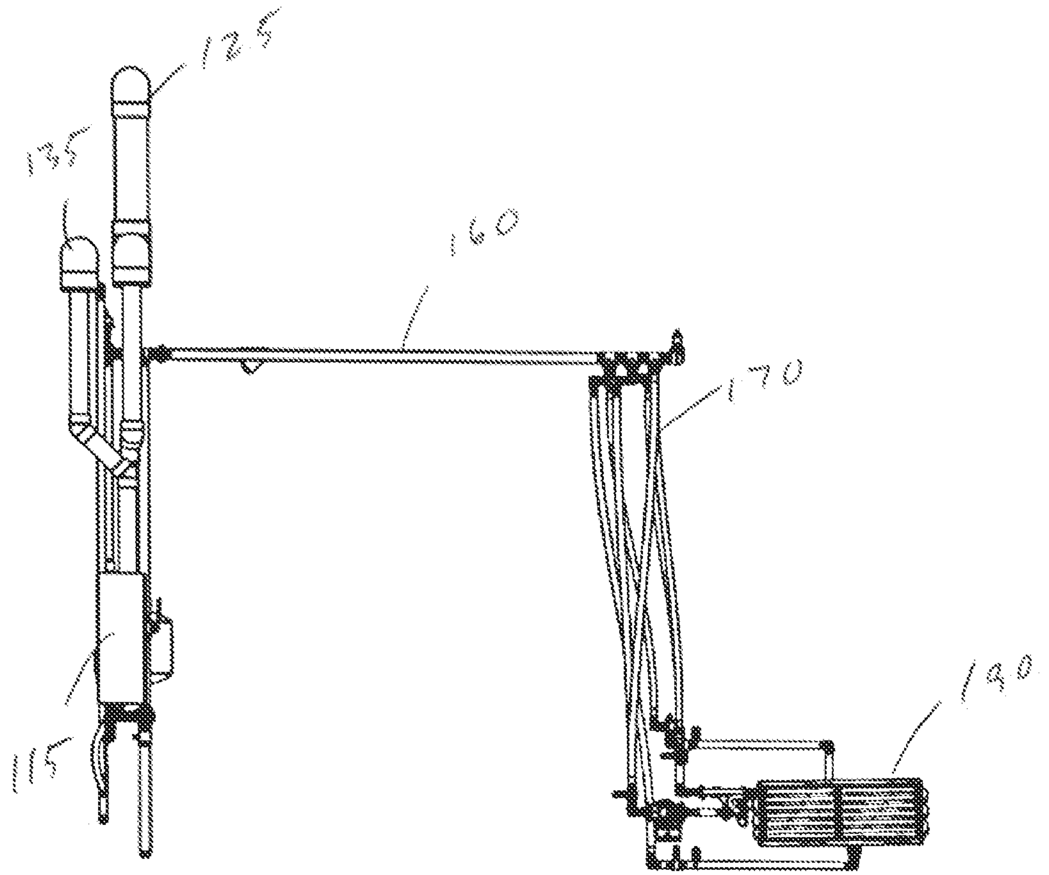
FIG. 9 is a second side view of the heat assembly illustrated in FIG. 4.
Figure 10:
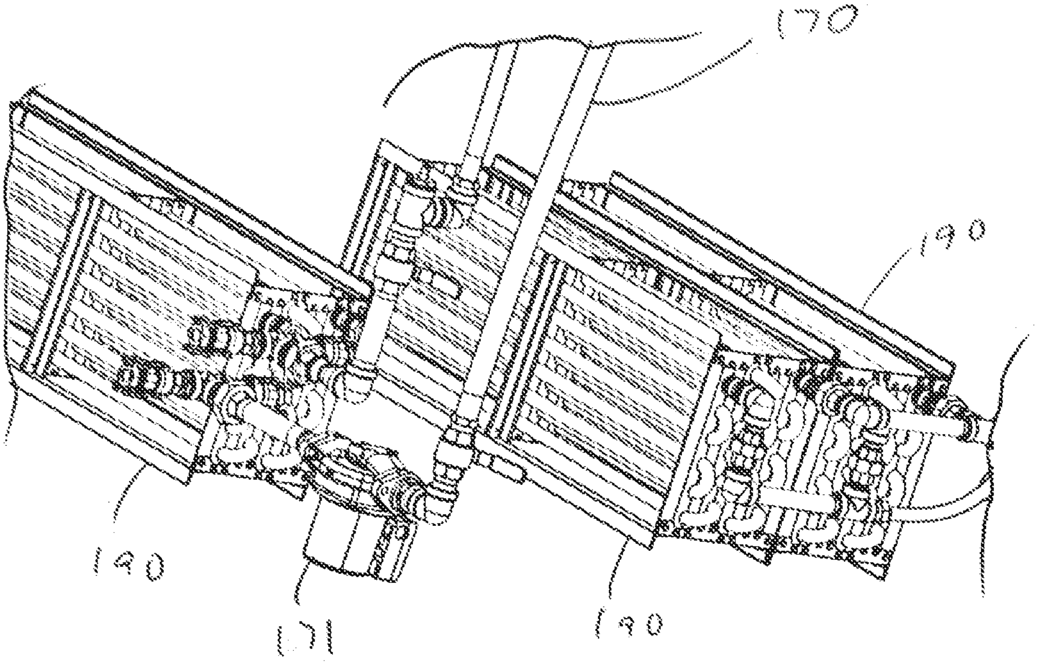
FIG. 10 is a partial perspective view showing plumbing and heat exchangers of the heat assembly.
Figure 11:
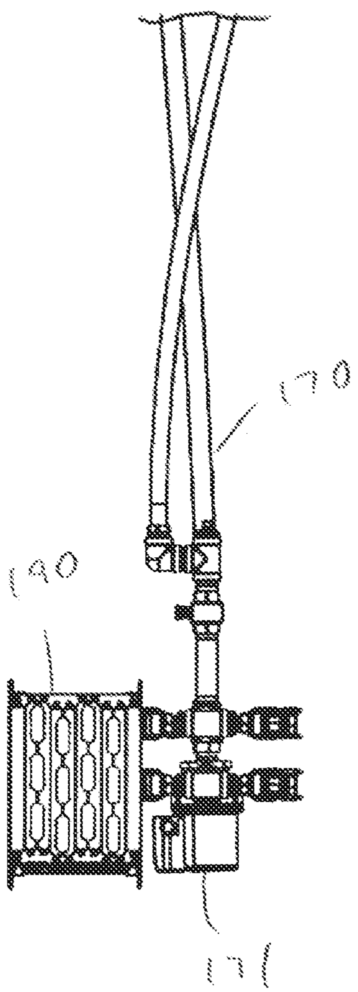
FIG. 11 is a side view of plumbing connected to a heat exchanger.
Figure 12:
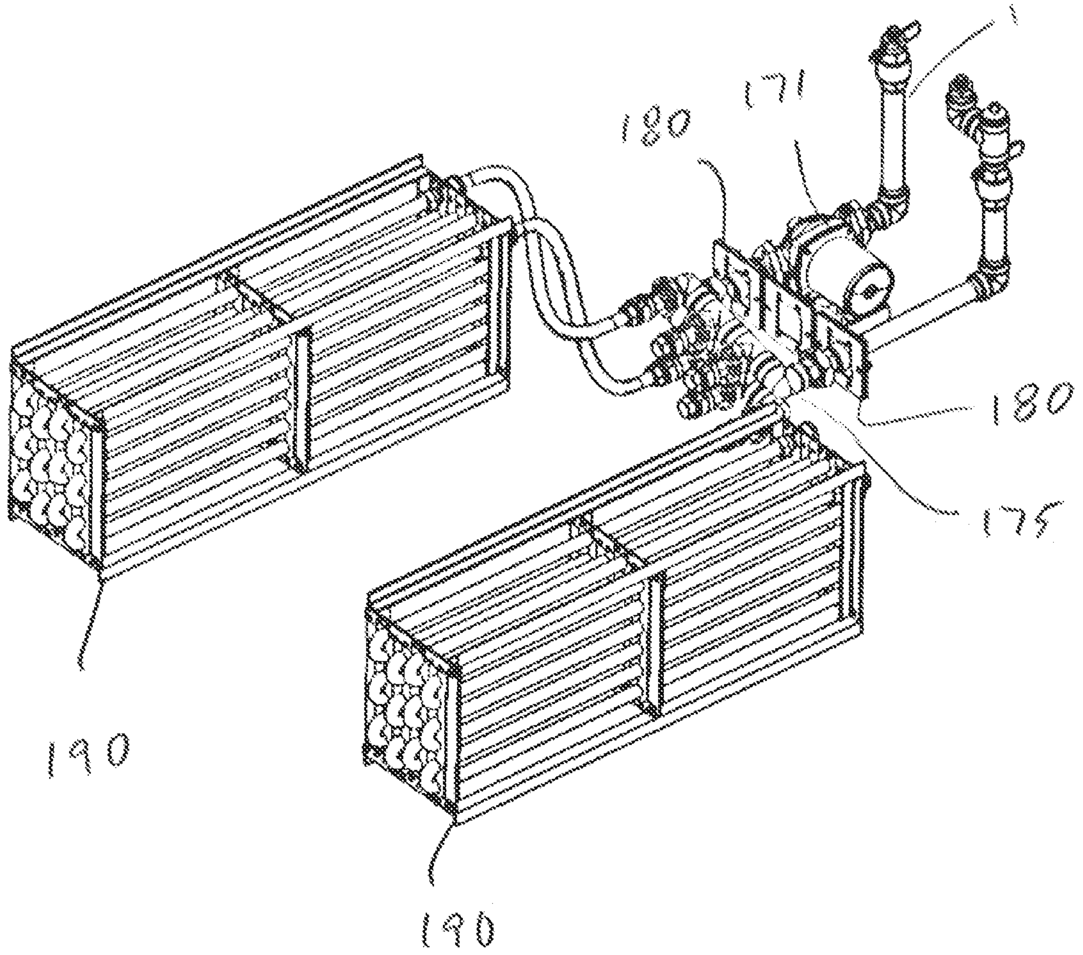
FIG. 12 is an illustration of two heat exchangers in a zone of a wash machine.
Figure 13:
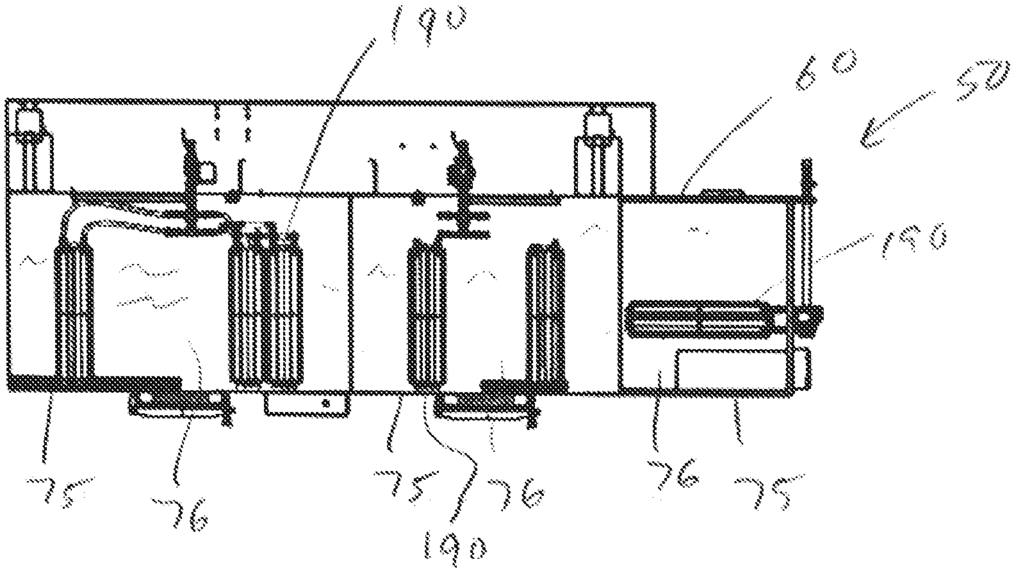
FIG. 13 is a top sectional view showing heat exchangers in zones of a three-zone wash machine.
Figure 14:
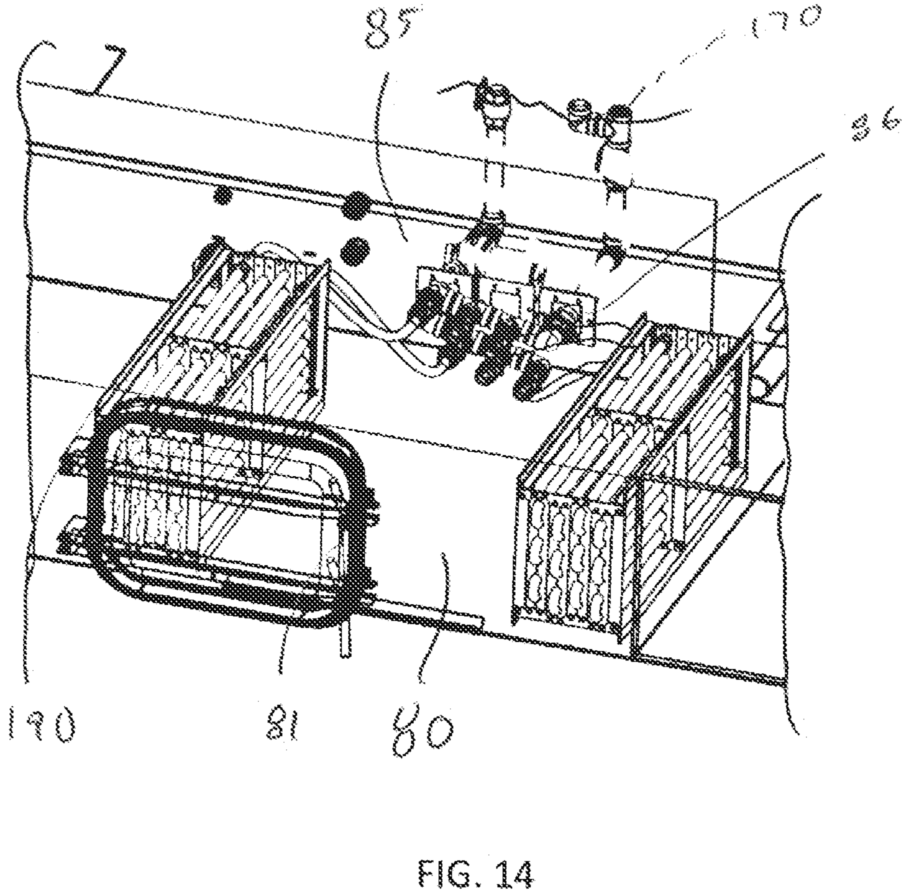
FIG. 14 is a perspective view showing two heat exchangers in a zone of a wash machine.
Figure 15:
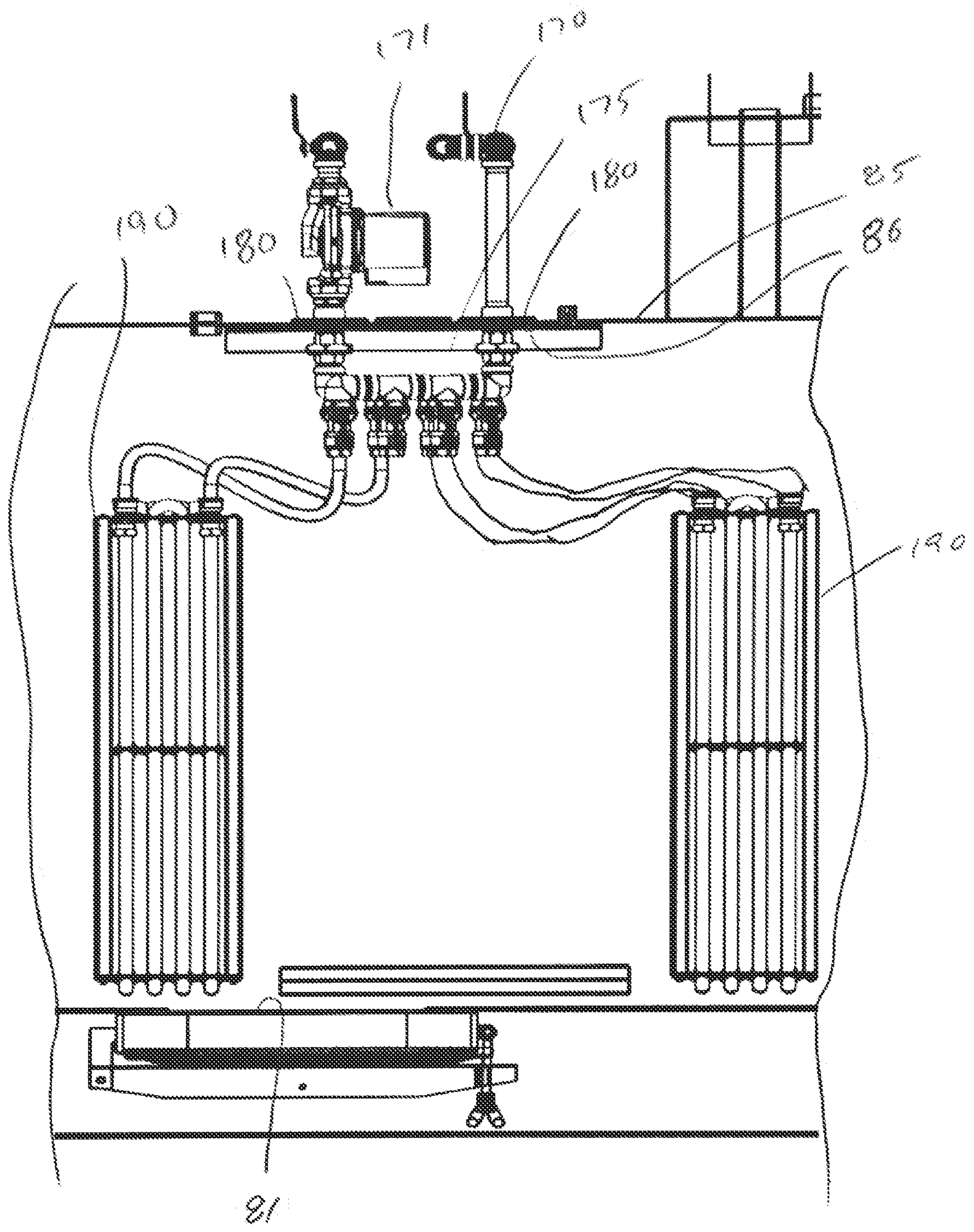
FIG. 15 is a partial top view of a reservoir showing two heat exchangers and plumbing.
Figure 16:
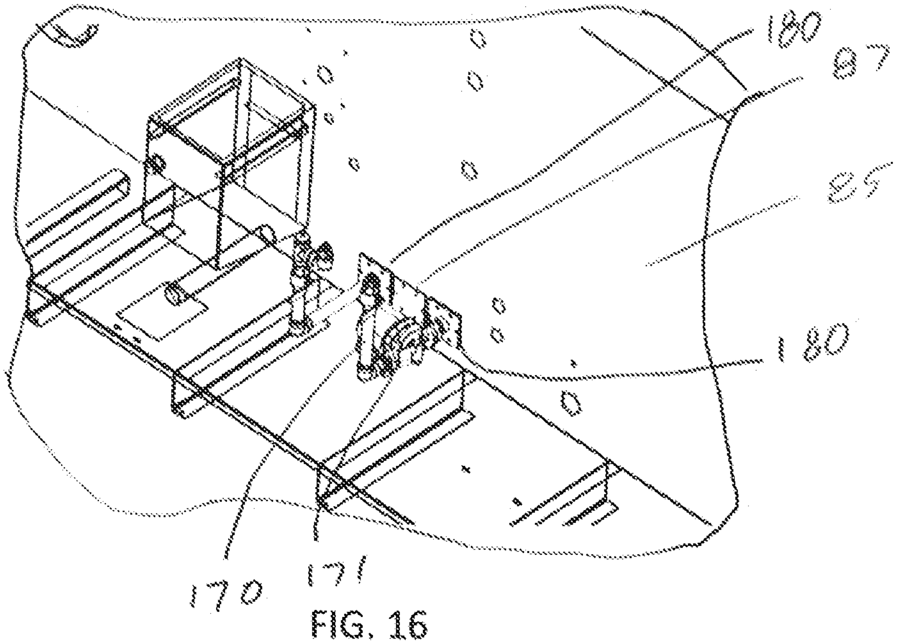
FIG. 16 is a rear perspective view showing plumbing passing through adapter plates connected to the wash machine housing at heater holes.
Figure 17:
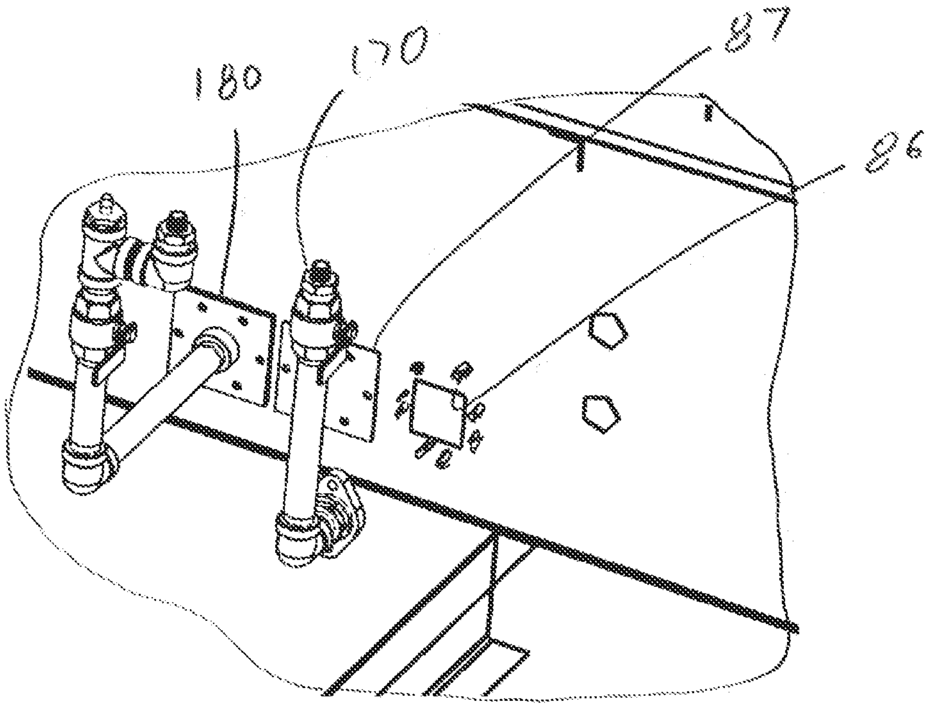
FIG. 17 is similar to FIG. 16, but shows plumbing and an adapter plate removed to show the heater hole.

An exemplary parts washing machine 50 is illustrated in FIGS. 1-3. The parts washing machine 50 has a housing 60 and three zones 70. There could be more or fewer zones without departing from the broad aspects of the present invention. Each zone 70 has a reservoir 75. The reservoir has walls. One wall 80, which can be a front wall, can have an access port 81 covered by a cover, to allow access into the reservoir 75. Another wall 80, which is preferably a rear or end wall, has at least one (preferably several) heater holes or openings 86 therethrough. Covers 87 can be provided to cover unused heater holes 86. Each zone 70 further has a dispenser 90, to dispense the medium from the respective reservoir 75 towards an intended object.

In the illustrated embodiment, the zone 70 on the left, when viewing the drawings, is a wash zone. The medium 76 in the reservoir 75 is a solution containing chemicals used to clean parts/components. The dispenser in the wash zone is a sprayer. The middle zone 70 is a rinse zone. Rinse water from the reservoir is dispensed with a sprayer towards the parts/components. The zone 70 on the right is a blowoff zone. The reservoir is an air chamber, and the dispenser can be a blow-off assembly such as an air nozzle or air knife. Each separate zone 70 can be heated to a different selected temperature.

Turning now to FIGS. 4-9, it is seen that a preferred embodiment of a heat assembly 100 is illustrated (and shown in isolation). The heat assembly 100 has at least one tankless heater 110. A second tankless heater 120 is illustrated to show the modular nature of the present invention. Any number of tankless heaters can be used depending on the anticipated thermal load of the washer. An intake 125 and exhaust 135 are provided. It is appreciated that the tankless heaters 110 and 120, and the intake 125 and exhaust 135, can be located remote from the housing 60. It is even possible that they can be located in separate rooms. It is also understood that the heater(s) could be mounted on the housing.

The heat assembly 100 further has plumbing 150 which comprises pipes and pumps. Specifically, the plumbing 150 preferably has a main circulation loop 160 with a main circulation loop pump 161, as well as a zone loop 170 with a zone loop pump 171. The main circulation loop is preferably continuously circulated by the pump and the tanks automatically turn on if the temperature of water flowing through the tankless heater is less than the desired main circulation loop temperature. The main circulation loop temperature may be 185 degrees Fahrenheit. Yet, it is understood that the main circulation loop temperature could be greater or less than this temperature without departing from the broad aspects of the present invention. The main circulation loop 160 is located outside of the reservoir 75.

It is appreciated that the main circulation loop 160 is considered a single heat source regardless of the number of heaters used to maintain the temperature in the main circulation loop 160.

At least one heat exchanger 190 is preferably within the reservoir 75 each zone 70 that requires heat. The number of heat exchangers in each zone is determined by the thermal output required for each zone and the heat transfer capacity of each heat exchanger. It is preferred that one heat exchanger will be able to transfer the same amount of heat as one existing electric heating element. Yet, it is understood that the heat exchanger transfer capacity could be greater or less than an electric element heat transfer capacity. The heat exchangers 190 have a body 191 and tubes 193. The tubes 193 can be corrugated tubes to increase surface area relative to tube length. The heat exchanger 190 can be inserted into and removed from the reservoir 75 via the access port 81.

Zone loop 171 of the plumbing connects the heat exchanger 190 to the main circulation loop 160. Preferably, two adapters 180 are used to allow the plumbing in the zone loop 170 (both feed line and return line) to pass through heater openings 86 to connect to the heat exchanger or a manifold (to be indirectly connected to the heat exchanger). The adapters 180 fasten to the wall 85 and can be used with a gasket, when desired, to make a seal. It is appreciated that the used of a gasket is not necessary. It is seen that the adapters are preferably plates that can fasten to the wall, and have plumbing connections allowing plumbing lines to connect thereto.

A manifold 175 is preferably used within each reservoir 75. Each heat exchanger 190 can hook up feed and return lines to the manifold 175.

A sensor 200, which is preferably a thermocouple, is in each zone 70. When the sensor senses that the temperature of the medium 76 within the reservoir 70 is below a predetermined temperature (any temperature up to the main circulation loop temperature), a controller 210 turns on the zone pump 171 to circulate water from the main circulation loop 160, through the heat exchanger 190 and back to the main circulation loop. The pump 171 turns off under direction of the controller when the sensor 200 senses that the temperature within the reservoir 75 has reached the desired temperature.

Each zone 70 has its own sensor 200, and each zone can be independently controlled by the controller 210 in real time to access the hot water in the main circulation loop 160 via operation of the zone loop pump 171 to move fluid in the zone loop 70 between the heat exchanger 190 and the main circulation loop 160. In this regard, the sensor 200, controller 210 and zone pump 171 are in communication with each other. There is preferably a zone loop for each zone that is independently operable with the main circulation loop.

Figure 18:
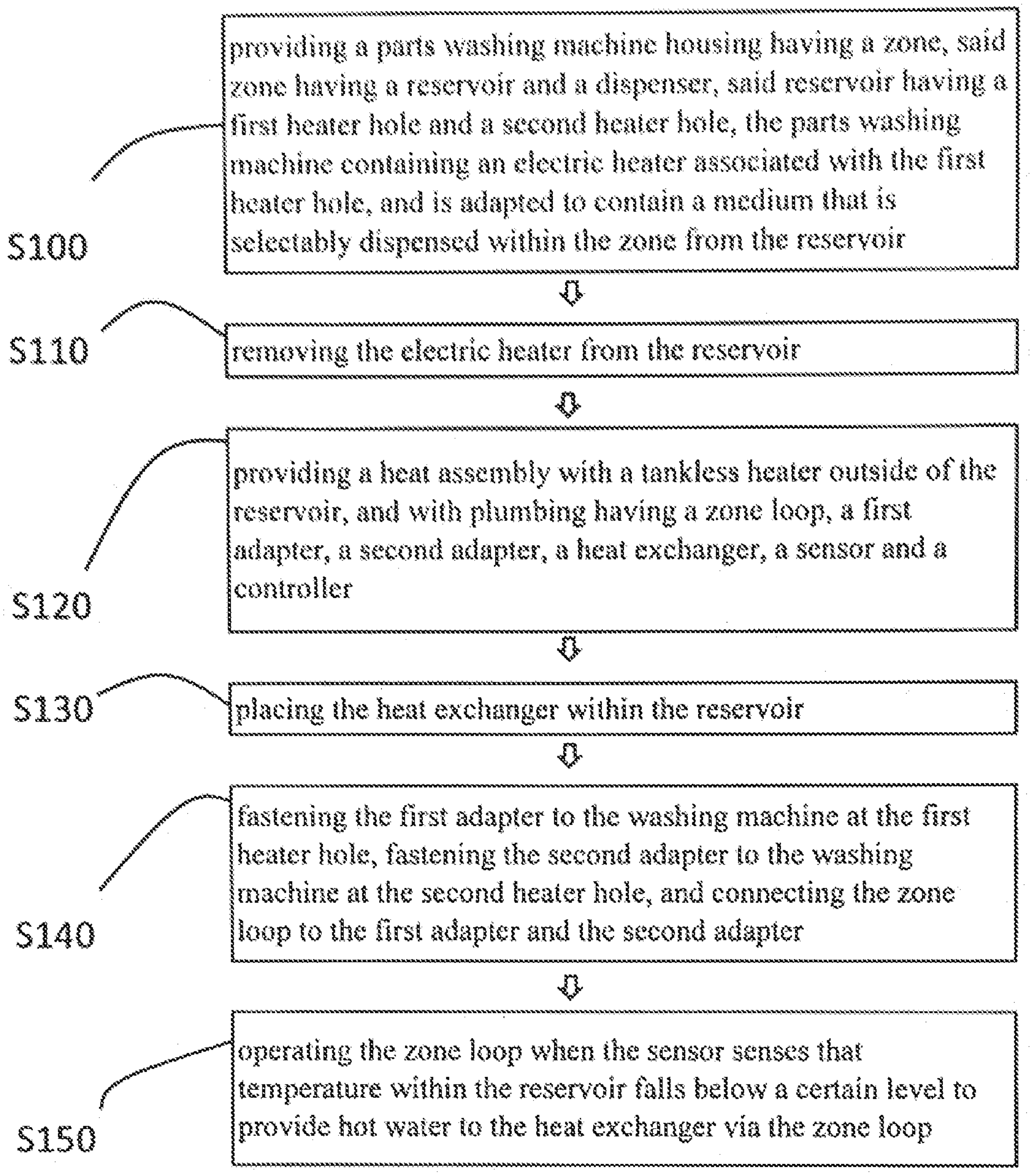
FIG. 18 is a flow chart showing a method of converting an electrically heated washing machine to a gas heated washing machine.

Now, turning to FIG. 18, it is seen that a preferred method of converting an electric parts washing machine (such as machine 10) to a gas parts washing machine (such as machine 50) is illustrated.

One method of converting an electric heated parts washing machine to a gas heated parts washing machine, and then using the gas heated parts washing machine, comprises the steps: (S100) providing a parts washing machine housing having a zone, said zone having a reservoir and a dispenser, said reservoir having a first heater hole and a second heater hole, the parts washing machine containing an electric heater associated with the first heater hole, and is adapted to contain a medium that is selectably dispensed within the zone from the reservoir; (S110) removing the electric heater from the reservoir; (S120) providing a heat assembly with a tankless heater outside of the reservoir, and with plumbing having a zone loop, a first adapter, a second adapter, a heat exchanger, a sensor and a controller; (S130) placing the heat exchanger within the reservoir; (S140 fastening the first adapter to the washing machine at the first heater hole, fastening the second adapter to the washing machine at the second heater hole, and connecting the zone loop to the first adapter and the second adapter; and (S150) operating the zone loop when the sensor senses that temperature within the reservoir falls below a certain level to provide hot water to the heat exchanger via the zone loop.

Optionally, a main circulation loop can be provided and the method can further comprise operating the main circulation loop and heater to maintain a desired main circulation loop temperature.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

A parts washing machine for cleaning a part, said parts washing machine being a convertible parts washing adapted for use with a gas heater, said parts washing machine comprising: a parts washing machine housing having a zone, said zone having a reservoir containing a medium to be selectively heated and dispensed into said zone via a dispenser, said reservoir having a first heater hole and a second heater hole, the reservoir further comprising an access port; and a heating assembly having: a tankless heater, said tankless heater configured to heat water; a heat exchanger, said heat exchanger being insertable into and removable from said reservoir through said access port; and plumbing comprising a zone loop that routes water to said heat exchanger through said first heater hole and routes water from said heat exchanger through said second heater hole.

A parts washing machine for cleaning a part, said parts washing machine comprising: a parts washing machine housing having a zone, said zone having a reservoir and a dispenser, said reservoir having a first heater hole and a second heater hole, and is adapted to contain a medium that is selectably dispensed from said reservoir within said zone; and a heating assembly having: a tankless heater, said tankless heater configured to heat water; a heat exchanger, said heat exchanger being received in said reservoir; and plumbing comprising a main circulation loop, a main circulation loop pump, a zone loop, and a zone loop pump, said main circulation loop being outside of said reservoir and said zone loop interconnecting said main circulation loop with said heat exchanger through said first heater hole and said second heater hole.

Each of these structures can also be combined with each other and/or with one or more other features of the parts washing machine as described above.

It is further appreciated that there are several unique method features according to the present invention as described herein. These features can be utilized individually or combined with other features in any possible way, such as being coupled with other features, tripled with other features and/or used all together without departing from the broad aspects of the present invention.

Thus, it is apparent that there has been provided, in accordance with the invention, a heating system and method of converting and operating a heating system that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A parts washing machine for cleaning a part, said parts washing machine being a convertible parts washing machine that is convertible from an electric heated machine to a gas heated machine adapted for use with a gas heater, said parts washing machine comprising:

a parts washing machine housing having a zone, said zone having a reservoir containing a medium to be selectively heated and dispensed into said zone via a dispenser, said reservoir having a first heater hole and a second heater hole, the reservoir further comprising an access port; and a heating assembly having:

a tankless heater, said tankless heater configured to heat water;

a heat exchanger, said heat exchanger being insertable into and removable from said reservoir through said access port; and plumbing comprising a zone loop that routes water to said heat exchanger through said first heater hole and routes water from said heat exchanger through said second heater hole.

2. The parts washing machine of claim 1, wherein said plumbing further comprises a main circulation loop, a main circulation loop pump, and a zone loop pump, said main circulation loop being outside of said reservoir and said zone loop interconnecting said main circulation loop with said heat exchanger through said heater hole.

3. The parts washing machine of claim 2 wherein said main circulation loop is heated to a predetermined temperature by said tankless heater.

4. The parts washing machine of claim 1 further comprising:

a first adapter connected to said parts washing machine housing at said first heater hole; and a second adapter connected to said parts washing machine housing at said second heater hole.

5. The parts washing machine of claim 4 further comprising a manifold, said manifold being connected to said first adapter and said second adapter, wherein said heat exchanger is connected to said manifold.

6. The parts washing machine of claim 1 wherein:

said zone is a first zone;

said zone loop is a first zone loop;

said zone loop pump is a first zone loop pump;

said parts washing machine has a second zone; and said plumbing has a second zone loop and a second zone loop pump.

7. The parts washing machine of claim 6 wherein operation of said first zone loop pump is independent of operation of said second zone loop pump.

8. The parts washing machine of claim 1 wherein said heating assembly comprises a plurality of tankless heaters.

9. A parts washing machine for cleaning a part, said parts washing machine comprising:

a parts washing machine housing having a zone, said zone having a reservoir and a dispenser, said reservoir having a first heater hole and a second heater hole, and is adapted to contain a medium that is selectably dispensed from said reservoir within said zone; and a heating assembly having:

a tankless heater, said tankless heater configured to heat water;

a heat exchanger, said heat exchanger being received in said reservoir; and plumbing comprising a main circulation loop, a main circulation loop pump, a zone loop, and a zone loop pump, said main circulation loop being outside of said reservoir and said zone loop interconnecting said main circulation loop with said heat exchanger through said first heater hole and said second heater hole.

10. The parts washing machine of claim 9 wherein said main circulation loop is heated to a predetermined temperature by said tankless heater.

11. The parts washing machine of claim 9 further comprising:

a first adapter connected to said parts washing machine housing at said first heater hole; and a second adapter connected to said parts washing machine housing at said second heater hole, wherein said zone loop is connected to said first adapter and to said second adapter.

12. The parts washing machine of claim 11 further comprising a manifold, said manifold being connected to said first adapter and said second adapter, wherein said heat exchanger is connected to said manifold.

13. The parts washing machine of claim 9 wherein:

said zone is a first zone;

said zone loop is a first zone loop;

said zone loop pump is a first zone loop pump;

said parts washing machine has a second zone; and said plumbing has a second zone loop and a second zone loop pump.

14. The parts washing machine of claim 13 wherein operation of said first zone loop pump is independent of operation of said second zone loop pump whereby said first zone is heated to a first selected zone temperature and said second zone is heated to a second selected zone temperature.

15. The parts washing machine of claim 9 wherein said heating assembly comprises a plurality of tankless heaters.

16. A method of converting an electric heated parts washing machine to a gas heated parts washing machine, and then using the gas heated parts washing machine, the method comprising the steps:

providing a parts washing machine housing having a zone, said zone having a reservoir and a dispenser, said reservoir having a first heater hole and a second heater hole, the parts washing machine containing an electric heater associated with the first heater hole, and is adapted to contain a medium that is selectably dispensed within the zone from the reservoir;

removing the electric heater from the reservoir;

providing a heat assembly with a tankless heater outside of the reservoir, and with plumbing having a zone loop, a first adapter, a second adapter, a heat exchanger, a sensor and a controller;

placing the heat exchanger within the reservoir;

fastening the first adapter to the washing machine at the first heater hole, fastening the second adapter to the washing machine at the second heater hole, and connecting the zone loop to the first adapter and the second adapter; and operating the zone loop when the sensor senses that temperature within the reservoir falls below a certain level to provide hot water to the heat exchanger via the zone loop.

17. The method of claim 16 wherein the step of providing a heat assembly further comprises providing the plumbing with a main loop and a main loop pump, the main loop being heated to a predetermined temperature via the tankless heater, and the zone loop being connected to the main loop.

18. The method of claim 17 wherein the step of providing a heat assembly further comprises providing plumbing with a second zone loop and a second zone loop pump, wherein operation of the zone loop pump is independent of operation of the second zone loop pump.

19. The method of claim 16 wherein the step of providing a heat assembly further comprises proving a manifold, the manifold being connected to the first adapter and the second adapter, and wherein the heat exchanger is connected to the manifold.

20. The method of claim 16 wherein the step of providing a tankless heater comprises the step of providing a plurality of tankless heaters, each of the tankless heaters being in fluid communication with the main loop.

* * * * *